United States Patent
Naumann et al.

(10) Patent No.: US 7,347,735 B2
(45) Date of Patent: Mar. 25, 2008

(54) CONTROLLER WITH INFORMATION CONVEYING BACKLIGHT MODULE AND CABLE FOR CONNECTING THE CONTROLLER TO AN AUTOMATED TOOL

(75) Inventors: William L. Naumann, Chardon, OH (US); Craig A. Montross, Hartville, OH (US); Zuher Khalaf, Troy, MI (US); Jeffrey S. Aranowski, Macomb, MI (US); Doug Versele, Westland, MI (US)

(73) Assignee: The Stanley Works, New Britain, CT (US)

( * ) Notice: Subject to any disclaimer, the term of this patent is extended or adjusted under 35 U.S.C. 154(b) by 47 days.

(21) Appl. No.: 11/388,209

(22) Filed: Mar. 24, 2006

(65) Prior Publication Data

US 2007/0225843 A1    Sep. 27, 2007

(51) Int. Cl.
*H01R 33/00* (2006.01)
(52) U.S. Cl. .................................. 439/660; 439/502
(58) Field of Classification Search ........ 439/502–504, 439/638, 660
See application file for complete search history.

(56) References Cited

U.S. PATENT DOCUMENTS

| | | | | |
|---|---|---|---|---|
| 5,921,799 A | * | 7/1999 | Forrester | 439/346 |
| 6,773,306 B2 | * | 8/2004 | Plishner | 439/620.15 |
| 7,033,209 B2 | * | 4/2006 | Swiatek et al. | 439/502 |
| 7,094,971 B2 | * | 8/2006 | Johnsen | 174/84 R |
| 7,186,137 B2 | * | 3/2007 | Rock | 439/502 |
| 7,273,384 B1 | * | 9/2007 | So | 439/172 |
| 7,282,645 B2 | * | 10/2007 | Locke | 174/100 |

* cited by examiner

*Primary Examiner*—Khiem Nguyen
(74) *Attorney, Agent, or Firm*—Pillsbury Winthrop Shaw Pittman LLP (57) ABSTRACT

A controller that controls an automated tool that comprises a monochromatic display, a backlighting module, and a processor. The monochromatic display comprises a plurality of pixels that are selectively activated and deactivated to convey information to a user. The backlighting module provides a backlight for the display, wherein the backlighting module is capable of controllably changing the color of the backlight. The processor that controls the display to selectively activate and deactivate the plurality of pixels to convey information about the automated tool, and wherein the processor controls the backlighting module such that the backlight provided by the backlighting module conveys information about the automated tool.

15 Claims, 7 Drawing Sheets

| Contact | x | y |
|---|---|---|
| 48c | 0.092 | 0.170 |
| 48h | 0.238 | 0.095 |
| 48i | 0.253 | -0.013 |
| 48p | 0.227 | -0.112 |
| 48k | 0.164 | -0.196 |
| 48d | 0.000 | -0.193 |
| 48l | -0.164 | -0.196 |
| 48e | -0.227 | -0.112 |
| 48f | -0.253 | -0.013 |
| 48g | -0.238 | 0.095 |
| 48b | -0.092 | 0.170 |
| 48o | 0.164 | 0.023 |
| 48j | 0.129 | -0.092 |
| 48m | -0.129 | -0.092 |
| 48n | -0.164 | 0.023 |
| 48a | 0.000 | 0.010 |

CONTROLLER WITH INFORMATION CONVEYING BACKLIGHT MODULE AND CABLE FOR CONNECTING THE CONTROLLER TO AN AUTOMATED TOOL

BACKGROUND OF THE INVENTION

1. Field of the Invention

The invention relates generally to the use of a backlight on a monochromatic, pixilated display associated with a controller to convey information about an automated control being controlled with the controller.

2. Description of Related Art

Some conventional automated tools are controlled via controller devices that are operatively coupled thereto. Typical controller devices include indicator lights that may be actuated to indicate various information regarding the operation and/or condition of a tool. These indicator lights may be of specific colors to indicate certain completed assembly conditions, such as a green indicator light to indicate a good or OK condition, and a red indicator light to indicate a bad or Not OK condition. Very often, these indicator lights are situated on the controller having a label or pictogram to aid the user in identifying the meaning of the indicator light.

The indicator lights, and the interpretation of their meaning, can be a source of confusion to the user, especially when a particular controller device has multiple indicator lights simultaneously indicating the conditions of numerous control variables. The use of multiple indicator lights also adds to the cost of building such electronic controllers for power tools.

Additionally, controller devices typically indicate the information on a graphic display (e.g., a pixilated display separate from the indicator lights) to be readily visible to the assembly tool operator during the course of a production assembly process, but due to constraints in the size of the display, some system information can only be displayed when requested by means of a command manually inputted by a user via a user interface device. In such cases, information indicating a need for immediate attention may not be readily noticed by the user.

BRIEF SUMMARY OF THE INVENTION

One aspect of the invention relates to a controller that controls an automated tool. In one embodiment, the controller comprises a monochromatic display, a backlighting module, and a processor. The monochromatic display comprises a plurality of pixels that are selectively activated and deactivated to convey information to a user. The backlighting module provides a backlight for the display, wherein the backlighting module is capable of controllably changing the color of the backlight. The processor that controls the display to selectively activate and deactivate the plurality of pixels to convey information about the automated tool, and wherein the processor controls the backlighting module such that the backlight provided by the backlighting module conveys information about the automated tool.

Another aspect of the invention relates to a connector that forms a portion of an operative link between an automated tool and a controller that controls the automated tool, wherein information and/or power are carried between the automated tool and the controller via the operative link. In one embodiment the connector comprises housing that carries a connection interface on a first side. The connection interface comprises at least three primary mating elements and at least seven secondary mating elements, the primary mating elements having diameters between about 0.0616 inches and about 0.0635 inches and the secondary mating elements having diameters between about 0.0295 inches and about 0.0305 inches.

Another aspect of the invention relates to a system that comprises a connector and an automated tool. The connector comprises a connection interface on a first side, wherein the connection interface comprises a first primary mating element, a second primary mating element, a third primary mating element, a first secondary mating element, a second secondary mating element, a third secondary mating element, a fourth secondary mating element, a fifth secondary mating element, a sixth secondary mating element, and a seventh secondary mating element. The automated tool the comprises a tool interface adapted to interface with the connection interface to removably connect the automated tool with the connector such that (i) the automated tool receives three-phase AC power over the first primary mating element, the second primary mating element, and the third primary mating element, (ii) the automated tool transmits a signal related to a rotary position of a motor rotor associated with the automated tool over the first secondary mating element and the third secondary mating element, (iii) the automated tool receives a common return for the signals transmitted on the first secondary mating element and the third secondary mating element, the common return being received via the second secondary mating element, (iv) the automated tool receives DC power over the fourth secondary mating element, and DC power over the fifth secondary mating element, and (v) the automated tool transmits and receives communications in the form of a CANbus signal carried by the sixth secondary mating element and the seventh secondary mating element.

DETAILED DESCRIPTION OF THE INVENTION

Figure 1:
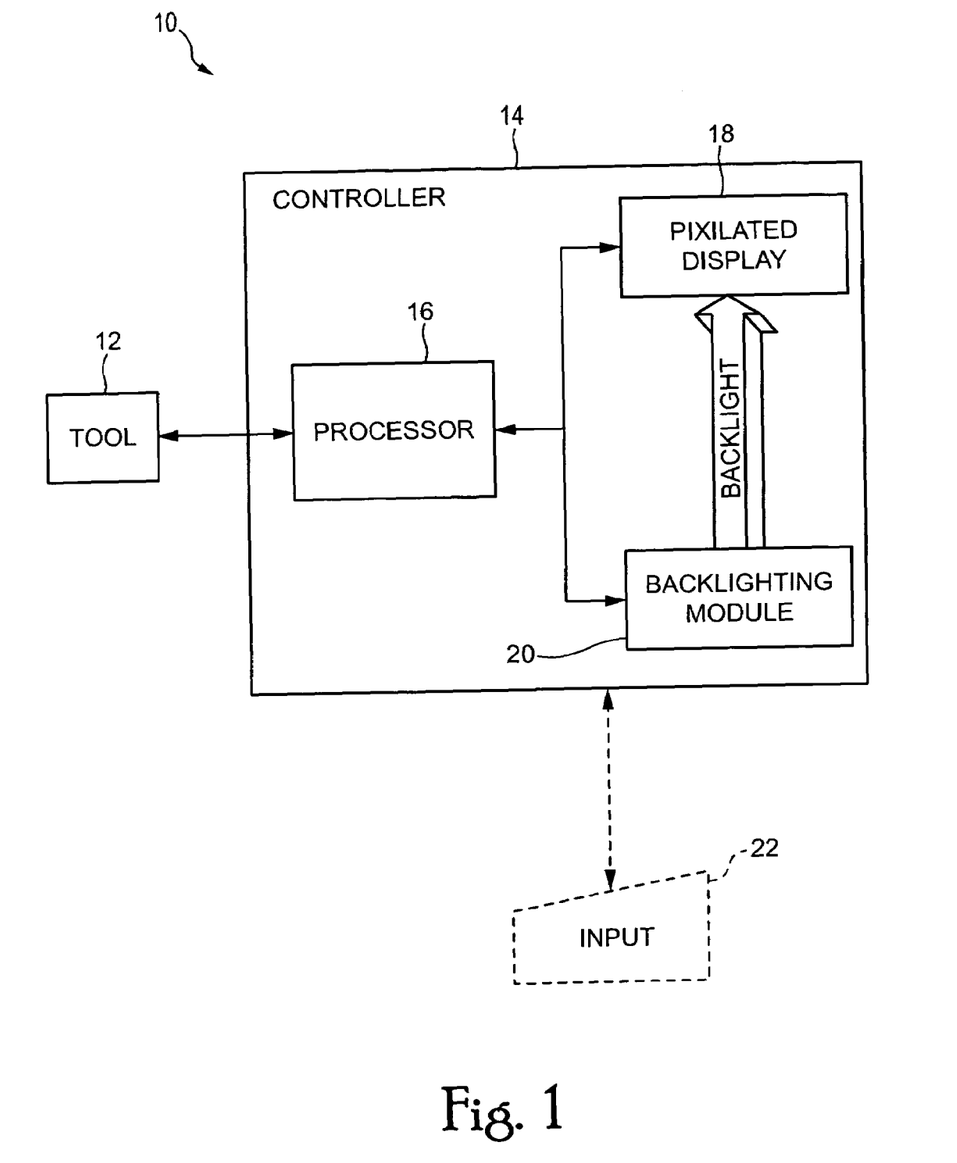
FIG. 1 illustrates a system, in accordance with one embodiment of the invention.

FIG. 1 illustrates a system 10, in accordance with one embodiment of the invention. System 10 includes a tool 12 and a controller 14 that is operatively coupled to tool 12 for the purpose of controlling one or more aspects of the operation of tool 12. In order to control tool 12, information is transmitted from controller 14 to tool 12. Additionally, feedback information generated by one or more sensors associated with tool 12 is transmitted from tool 12 to controller 14. The sensors associated with tool 12 may comprise one or more of a torque sensor, a motor temperature sensor, a motor rotor position sensor (e.g., an angle of rotation sensor), and/or other sensors. In one embodiment, tool 12 and controller 14 are coupled via a cable (e.g., the cabling discussed further below). However, this is not limiting, and in other embodiments, tool 12 may be operatively coupled to controller 14 via a wireless link, a network connection, and/or other operative communication links.

As shown in FIG. 1, controller 14 comprises a processor 16, a pixilated display 18, and a backlighting module 20. In one embodiment, pixilated display 18 is a monochromatic display that comprises a plurality of pixels that are selectively activated and deactivated to convey information to a user. For example, pixilated display 18 may comprise an LCD, an OLED array, a micro-mirror device, or another display. Backlighting module 20 provides a backlight for display 18. Backlighting module 20 is capable of controllably changing the color of the backlight provided to display 18. Processor 16 controls display 18 to selectively activate and deactivate the plurality of pixels included therein to convey information about tool 12, a task, job, or operation associated with tool 12 (e.g., a future operation, a completed operation, a current operation, etc.), and/or other information. Further, processor 16 controls backlighting module 20 such that the backlight provided by backlighting module 20 conveys information about automated tool 12. For instance, the color of the backlight may convey information, the alternation (or blinking) of colors of the backlight may convey information, or the backlight may otherwise convey information. As will be described further below, in some instances, the information conveyed by the pixels of display 18 is different from the information conveyed by the backlight provided backlighting module 20.

In one embodiment, tool 12 includes a fluid- or electric-powered tool that may be used in production environments to secure threaded fasteners (e.g., nuts and bolts) into joints. Tool 12 includes a handheld unit coupled to controller 14. In another embodiment, tool 12 may include a tool that is carried on an automated machine capable of positioning tool 12 (e.g., a CNC controlled machine, etc.). One handheld embodiment of tool 12 includes a high-speed, low-torque motor coupled to a planetary gear transmission to reduce the speed and increase the torque. The output of the gear transmission is in turn coupled to an output head. For example, an output head having a square or hexagonal drive spindle as the output shaft. Various interchangeable bits or sockets are connected to the output head in order to drive threaded fasteners, e.g., bits or sockets appropriate for driving various bolts, nuts and screws. As was mentioned above, tool 12 is equipped with torque and angle sensing transducers to enable closed-loop control by controller 14.

In the embodiment of FIG. 1, controller 14 controls the power supply for tool 12, and also monitors such variables as the current tool speed and current applied torque. In a typical fastening application, fasteners are tightened to a predetermined, specified torque. As tool 12 tightens fasteners at specified speeds and to specified torque levels, controller 14 controls the motor of tool 12 automatically so that the tightening speed and torque applied to the fastener and joint meets the specified limits. In one embodiment, controller 14 also serves the purpose of measuring the final or peak torque applied to each fastener. The value of this peak torque is then displayed on controller 14 at the completion of each tightening operation by the pixels of display 18. Other data, such as the angle of rotation of the fastener from a specified low, or snug torque value to the final or peak torque value may also be displayed. Occasionally, the number of completed fastening operations for a particular assembly may also be displayed.

The values of these measured variables may also be compared to production control limits for each variable, and backlighting module 20 may be controlled to provide a backlight that indicates when the values are in or out of these control limits. The backlight may be controlled according to a backlighting scheme in which one or more aspects of the backlight are assigned to one or more system and/or operation conditions according to predetermined criteria. For example, the backlight may include specific colors to indicate certain completed assembly conditions, such as a green color to indicate a good or OK condition, and a red color to indicate a bad or Not OK condition.

In one embodiment, control of backlighting module 20 by processor 16 includes adjusting the backlight to convey other assembly system information such as statistical control warnings, system error codes, or diagnostic warnings indicating the condition of system 10 or the need for preventative maintenance. For instance, the use of the backlight to convey this critical system information may alert the user when an operation or process of tool 12 is out of control, or for differentiating when system 10 is in need of maintenance and when system 10 is in good working order. These and other types of information may be considered secondary system information, as compared to the primary system information conveyed by the pixels of display 18, and may be of interest to those users with supervisory or maintenance responsibilities.

In one backlighting scheme, in accordance with one embodiment of the invention, when system 10 is in a standby condition with tool idle 12 and controller 14 turned on, the backlight color is white to indicate a standby condition while the pixels of display 18 indicate the torque value for which system 10 is adjusted. To initiate a normal operation cycle, the operator of tool 12 (in a handheld implementation of tool 12) guides tool 12 to the fastener and actuates the start switch located on tool 12. This action places controller 14 into the run mode and the backlight color is changed to a blue color indicating an in-cycle condition of operation. As the fastener is tightened, the torque will increase until either the operator aborts the cycle by releasing the start switch, or until the selected target torque is reached and controller 14 turns off tool 12. If the operator aborts the fastening cycle, and the peak torque applied to the fastener is less than the minimum specified torque, then the backlight color will change to a yellow color indicating a low torque condition. If the selected target torque is reached and the torque is within a specified limit corresponding to the target torque, then the backlight will change to a green color indicating a good torque condition. Under certain conditions, the peak torque applied to the fastener during a fastening cycle may exceed the maximum specified limit torque. In this case the backlight will change to a red color indicating a high torque condition. In any of these cases, the pixels of display 16 can be controlled independently of the backlight color by processor 16 to display, for example, the peak value of the torque for that tightening cycle, the angle of rotation of the fastener beyond a defined snug torque, or any other assembly data or a combination thereof. Alternately, the words OK or Not OK, or the words Low, OK, or High may be displayed using the pixels of display 18, independently of the backlight color.

As another example of a possible implementation of a backlighting scheme, the backlight color of the backlight provided by backlighting module 18 may be used to display statistical process control conditions. In such applications, controller 14 has the ability to continuously record the peak torque values in its memory and perform various statistical process control calculations on this information. If the calculations indicate that the process is statistically under control, the backlight color may be green, indicating a normal process. But if the calculations indicated that the process has exceeded statistical limits, the backlight color may be changed to red, indicating an assembly operation is trending toward an out of control condition.

In yet another example of a possible backlighting scheme, the backlight color may be used to display diagnostic conditions of system 10. In this backlighting scheme, controller 14 has the ability to continuously monitor various system health conditions, such as for example, the condition of a torque sensing transducer associated with tool 12, the efficiency of the motor drive system associated with tool 12, the number of completed cycles by tool 12, and/or other system health conditions. If all monitored conditions are normal, the display backlighting is displayed as green, indicating system 10 is in normal health. But if any condition indicates that system 10 is in need of service, the backlight color would be changed to red, indicating a need for service. In other related implementations, the colors of the backlight may indicate a specific area or component of system 10 that need servicing and/or or a type of service that system 10 is in need of.

It should be appreciated that the specific example of colors provided above are exemplary in nature, and that any color or combination of colors may be implemented in the described backlighting schemes. Further, in some backlighting schemes, the color of backlight may be alternately changed from one color to another in a blinking fashion to indicate certain conditions and/or an urgency of the indicated condition(s). For instance, the on and off cycle rate can be altered such that a more rapid rate indicates a more urgent need for attention. Additionally, the backlighting schemes described above are not intended to be limiting, as other backlighting schemes for conveying primary system information, secondary system information, or a combination of primary and secondary system information via the backlight provided by backlighting module 20 are contemplated within the scope of the invention.

In one embodiment, a plurality of backlighting schemes are stored at controller 14 (e.g., by processor 16), and the user is enabled to select a backlighting scheme for implementation using an input interface 22 associated with controller 14. Input interface 22 may include any device or devices that would enable the user to input information to controller 14. For instance, input interface 22 may comprise a keyboard, a keypad, a knob, a switch, a button, a touchpad, a touch screen, a dial, a mouse, a trackball, a graphical user interface, a joystick, or other devices that enable the input of information to an electronic device. In some instances, input interface 22 enables the user to adjust an existing backlighting scheme. For example, the user may adjust one or more of the backlighting colors, one or more of the types of secondary system information, and/or other aspects of the backlighting scheme.

In one embodiment of the invention, display 18 and backlighting module 20 may include a unit that is currently commercially available and uses one or more multi-colored light emitting diodes as a light source for the graphic display backlight. The multi-colored light emitting diodes used in such displays make use of a separate group of one or more diode elements for two or more three primary colors and provide the ability to selectively switch on selected ones of the primary colors with different degrees of intensity, thereby providing the possibility of selecting a large spectrum of background colors for the graphic display screen. In another embodiment, backlighting module 20 includes one or more light sources that emit white light, and includes a plurality of filters that correspond to a plurality of colors. In this embodiment, the color of the backlight is changed by positioning the filters to filter the light emitted by the light sources so that only light of a selected color is provided as the backlight. It should be appreciated that other embodiments of backlight module 20 may be implemented.

Figure 2:
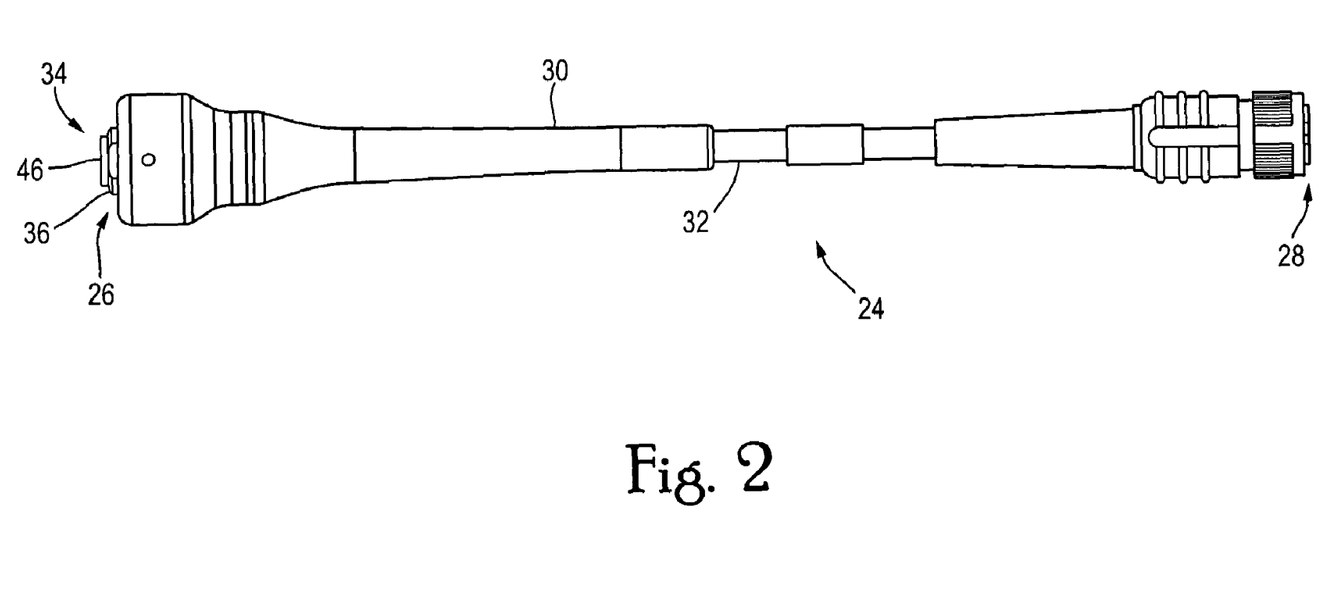
FIG. 2 illustrates a cable that couples a tool and a controller, in accordance with one embodiment of the invention.

As was discussed briefly above, tool 12 and controller 14 are operatively coupled with each other. In one embodiment, tool 12 and controller 14 are coupled by a cable that enables the transmission of information and/or power therebetween. FIG. 2 illustrates a cable 24 that couples tool 12 and controller 14, in accordance with one embodiment of the invention. As can be seen in FIG. 2, cable 24 includes a first connector 26 and a second connector 28. Cable body 30 runs between connectors 26 and 28 and houses a plurality of conductor lines that carry signals between connectors 26 and 28. Cable 24 includes a cable jacket 32 that substantially covers cable 24 to protect the components contained therein. In one embodiment, cable jacket 32 is formed from polyurethane.

In one embodiment, connector 26 is configured to enable a releasable connection between cable 24 and a tool (e.g., tool 10 of FIG. 1), and connector 28 is configured to enable a releasable connection between cable 24 and a tool controller (e.g., controller 12 of FIG. 1). In another embodiment, connector 26 is configured to enable a releasable connection between cable 24 and a tool, and connector 28 is configured to enable a releasable connection between cable 24 and another cable (e.g. a cable in connection with a tool controller). In one embodiment, connector 26 is configured to enable a releasable connection between a tool, and connector 28 is configured to enable a releasable connection between cable 24 and either of a tool controller or another cable.

Figure 3:
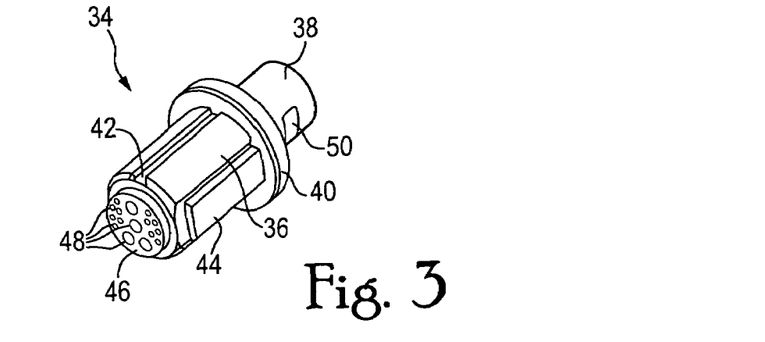
FIG. 3 illustrates a housing included in a connector, according to one embodiment of the invention.

FIGS. 3-7 illustrate a housing 34 included in connector 26, according to one embodiment of the invention. The specific dimensions of housing 34 shown in FIGS. 3-7 are provided for illustration of one embodiment of the invention, and are given in inches. These dimensions are not intended to be limiting. Referring to FIG. 3, housing 34 is shown in perspective. As is shown in FIG. 3, housing 34 comprises a first portion 36 and a second portion 38 that are generally cylindrical in shape and are coaxial. First and second portions 36 and 38 are separated by an annular protrusion 40. Second portion 38 has a smaller diameter than first portion 36. First portion 36 includes a slot 42 formed axially therein, and a protruding ridge 44 that runs axially along the cylindrical outer wall of first portion 36. In one embodiment, housing 34 is molded from plastic, and is adapted to interface with a size 15, Amphenol MIL SPEC Series III plug.

Housing 34 carries a connection interface 46. Connection interface 46 is formed with a substantially circular cross-section and is seated within the cylinder formed by first portion 36. Connection interface 46 comprises a plurality of mating elements 48. Mating elements 48 enable connector 26 to mate with a compatible connector (e.g., a connector associated with a tool, a connector associated with another cable, etc.) so as to enable the conductor lines carried within cable 24 to be operatively coupled with corresponding conductor lines in the compatible connector. In one embodiment, one or more of mating elements 48 comprise sockets. In another embodiment, one or more of mating elements 48 comprise pins. More particular descriptions one or more embodiments of connection interface 46, including the aspects and arrangement of mating elements 48, are provided below.

Figure 4:
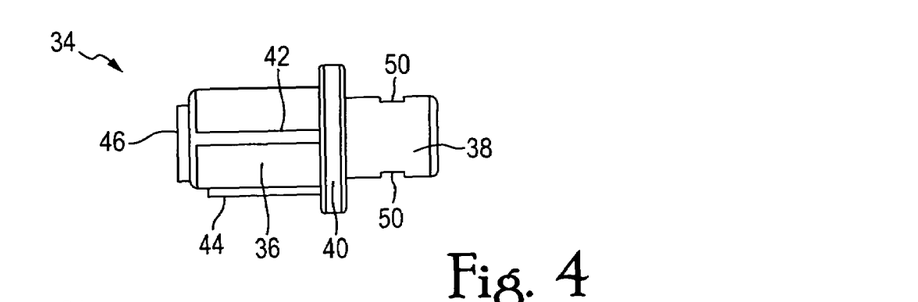
FIG. 4 illustrates a housing included in a connector, according to one embodiment of the invention.

FIG. 4 illustrates a dimensioned side elevation view of housing 34, according to one or more embodiments of the invention. More specifically, in the elevation view of FIG. 4, housing 34 is rotated so that slot 42 is aligned horizontally with the axis of portions 36 and 38.

Figure 5:
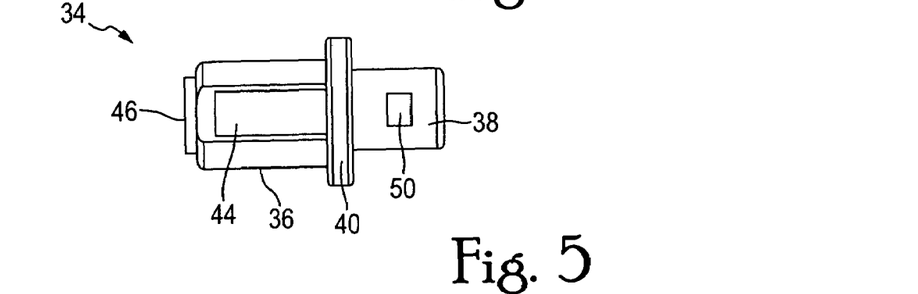
FIG. 5 illustrates a housing included in a connector, according to one embodiment of the invention.

FIG. 5 shows a dimensioned side elevation view of housing 34, in accordance with one embodiment of the invention. In the view shown in FIG. 5, housing 34 is rotated about axis of portions 36 and 38 by approximately 90 degrees to show protruding ridge 44. In addition, the view shows one of relief surfaces 50 straight on.

Figure 6:
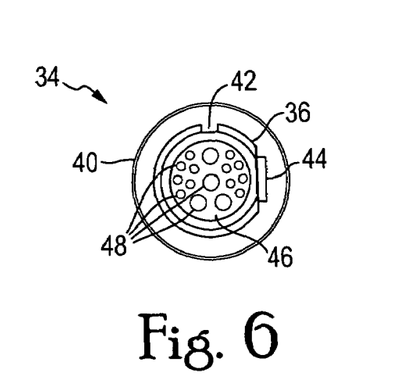
FIG. 6 illustrates a housing included in a connector, according to one embodiment of the invention.

FIG. 6 illustrates a dimensioned elevation view of housing 34, according to one embodiment of the invention. In FIG. 6, a straight ahead elevation of connection interface 46 is provided.

Figure 7:
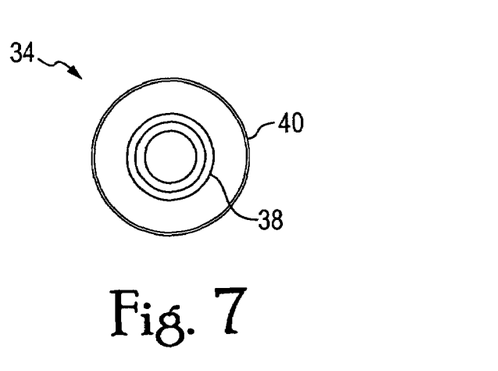
FIG. 7 illustrates a housing included in a connector, according to one embodiment of the invention.

FIG. 7 shows a dimensioned elevation view of housing 34, in accordance with one embodiment of the invention. In FIG. 7, housing 34 is depicted to illustrate a straight on view of second portion 38.

Figure 8:
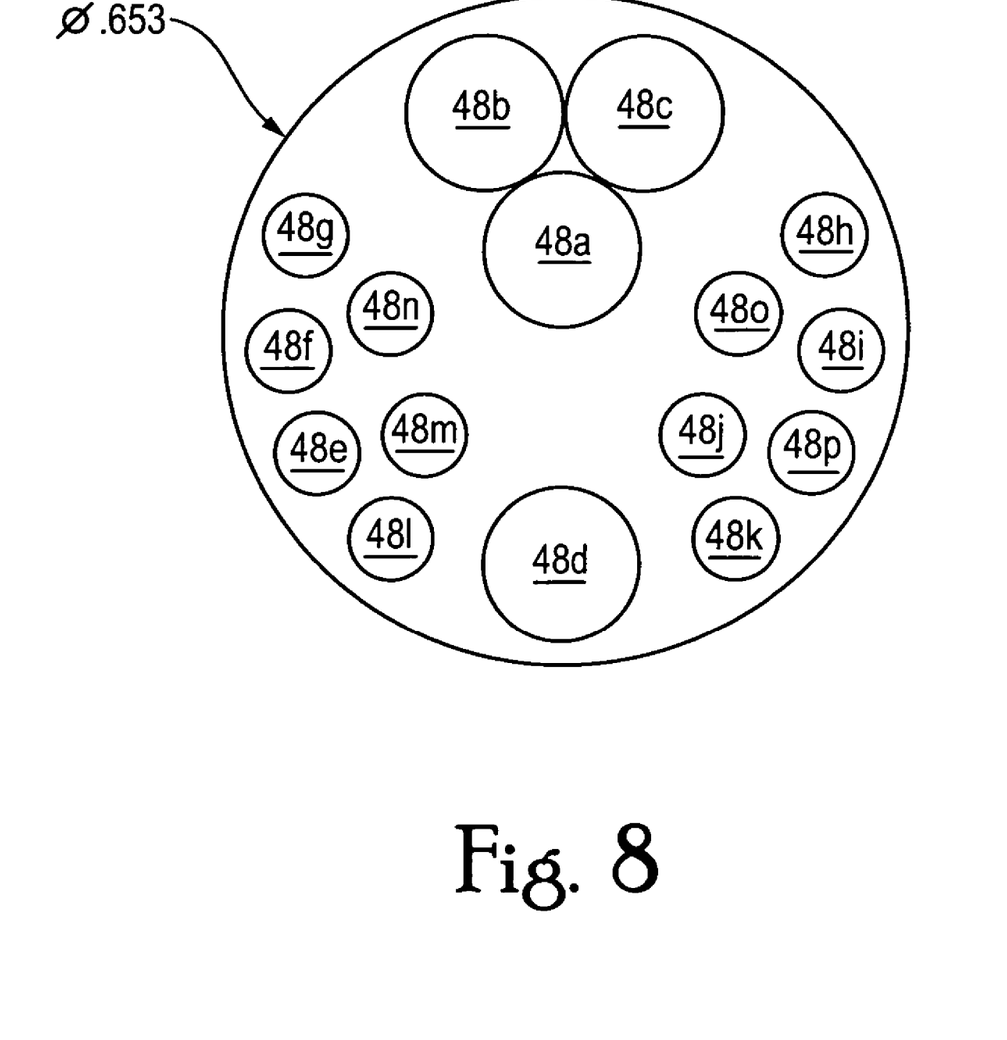
FIG. 8 illustrates an elevation view of a configuration of mating elements arranged on a connection interface of a connector, according to one embodiment of the invention.
Figure 9:
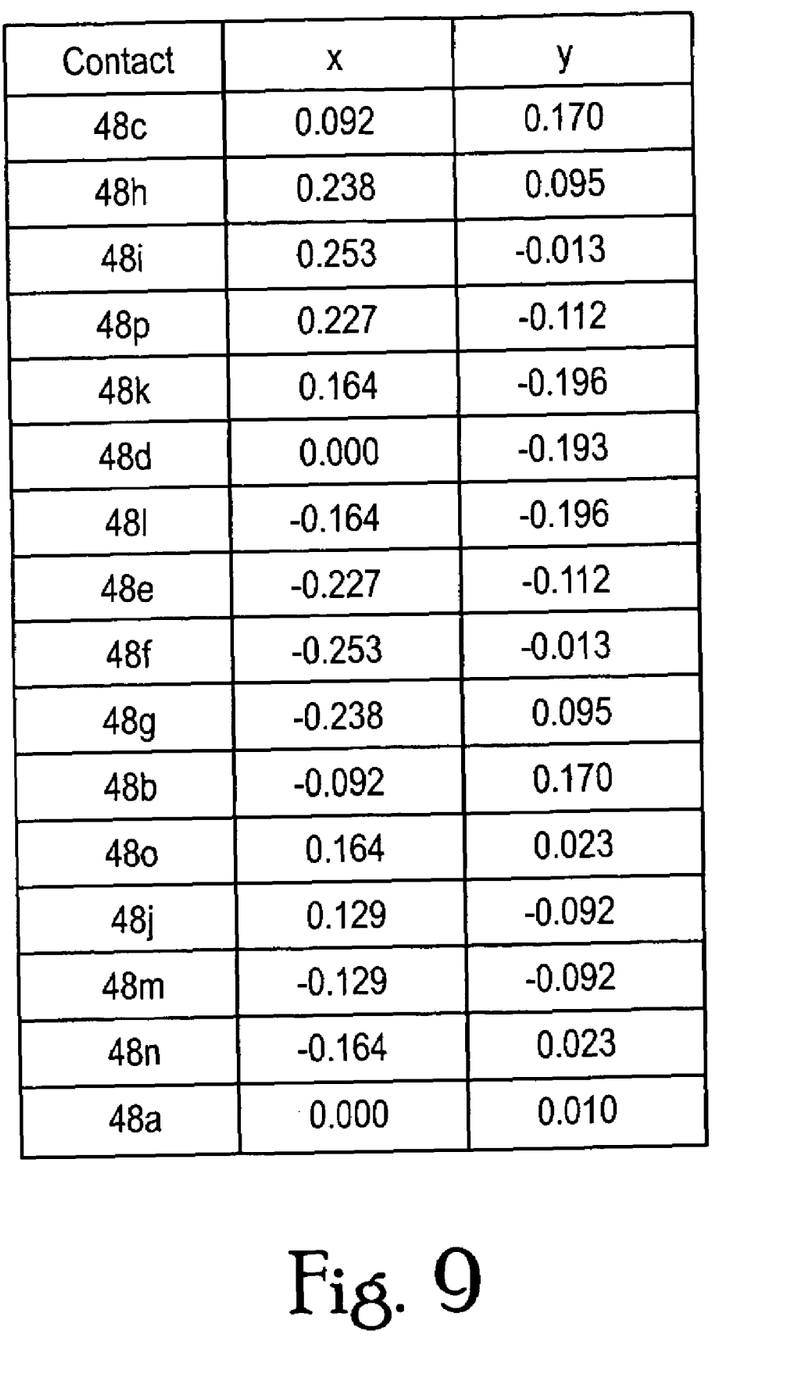
FIG. 9 includes a table that includes the coordinates of specific locations of mating elements on a connection interface where the coordinates are based on a Cartesian coordinate system originating substantially at the center of the connection interface, according to one embodiment of the invention.

FIG. 8 illustrates an elevation view of one configuration of mating elements 48 (illustrated in FIG. 8 as connection elements 48a-48p) on connection interface 46, according to one embodiment of the invention. In the embodiment shown, mating elements 48a-48p comprise primary mating elements 48a-48d and secondary mating elements 48e-48p. In some instances, primary mating elements 48a-48d have diameters between about 0.0616 inches and about 0.0635 inches, and secondary mating elements 48e-48p have diameters between about 0.0295 inches and about 0.0305 inches. In one embodiment, the specific locations of mating elements 48a-48p are located substantially at the coordinates shown in the table in FIG. 9, with respect to a Cartesian coordinate system originating substantially at the center of connection interface 46. The units of the coordinate system are inches. The layout of mating elements 48 on connection interface 46 depicted in FIG. 8 and described by the table of FIG. 9 represents an embodiment of connection interface 46 that provides for enhancements in conductor spacing (e.g., for insulation purposes), common mode rejection (e.g. for electrical noise suppression), and providing mating elements 48 in a configuration that fits within a size 15 connector shell.

Primary mating elements 48a-48c are configured to carry AC power. In one embodiment, primary mating elements 48a-48c carry three phase AC power with primary mating element 48b carrying a first phase (e.g., phase R), primary mating element 48c carrying a second phase (e.g., phase S), and primary mating element 48a carrying a third phase (e.g., phase T). In one embodiment, primary mating element 48d is kept at a ground potential (e.g., zero potential, etc.). The AC power carried by primary mating elements 48a-48d may be implemented by a connected tool to power a rotary motor (or another motor) in the tool.

Secondary mating elements 48e-48p are configured to carry various information, power, and shielding signals. In one embodiment, secondary mating elements 48j and 48k carry one or more digital information signals. In this embodiment, secondary mating element 48l carries a shielding signal that shields the digital information signals carried by secondary mating elements 48j and 48k from noise. In some instances, the digital information signals carried by secondary mating elements 48j and 48k comprise a CANbus signal (e.g., a–CANbus signal, a+CANbus signal, etc.). The digital information signals carried by secondary mating elements 48j and 48k enable control information to be transmitted to the tool and feedback information to be transmitted to the controller. The feedback information may be generated by the sensor(s) associated with the tool. Information may be transmitted by the digital information signals at a rate of 500 kbps.

In one embodiment, secondary mating elements 48h and 48i carry DC power. In this embodiment, secondary mating element 48o carries a shielding signal that shields the DC power carried by secondary mating elements 48h and 48i from noise. In some instances, the DC power carried by secondary mating elements 48h and 48i comprise a +12V DC power and a 12V DC return. The DC power carried by secondary mating elements 48h and 48i may power some or all of the sensors associated with the tool.

In one embodiment, secondary mating elements 48e and 48g carry one or more motor position output signals that indicate a rotary position of a motor rotor associated with the tool. In this embodiment, secondary mating element 48f carries a common return for the motor position output signals carried by secondary mating elements 48e and 48g. In some instances, the motor position output signals carried by secondary mating elements 48e and 48g comprise a cosine output signal and a sine output signal, respectively. Additionally, secondary mating element 48n may carry a shielding signal that shields the motor position output signals carried by secondary mating elements 48e-48g from noise.

Figure 10:
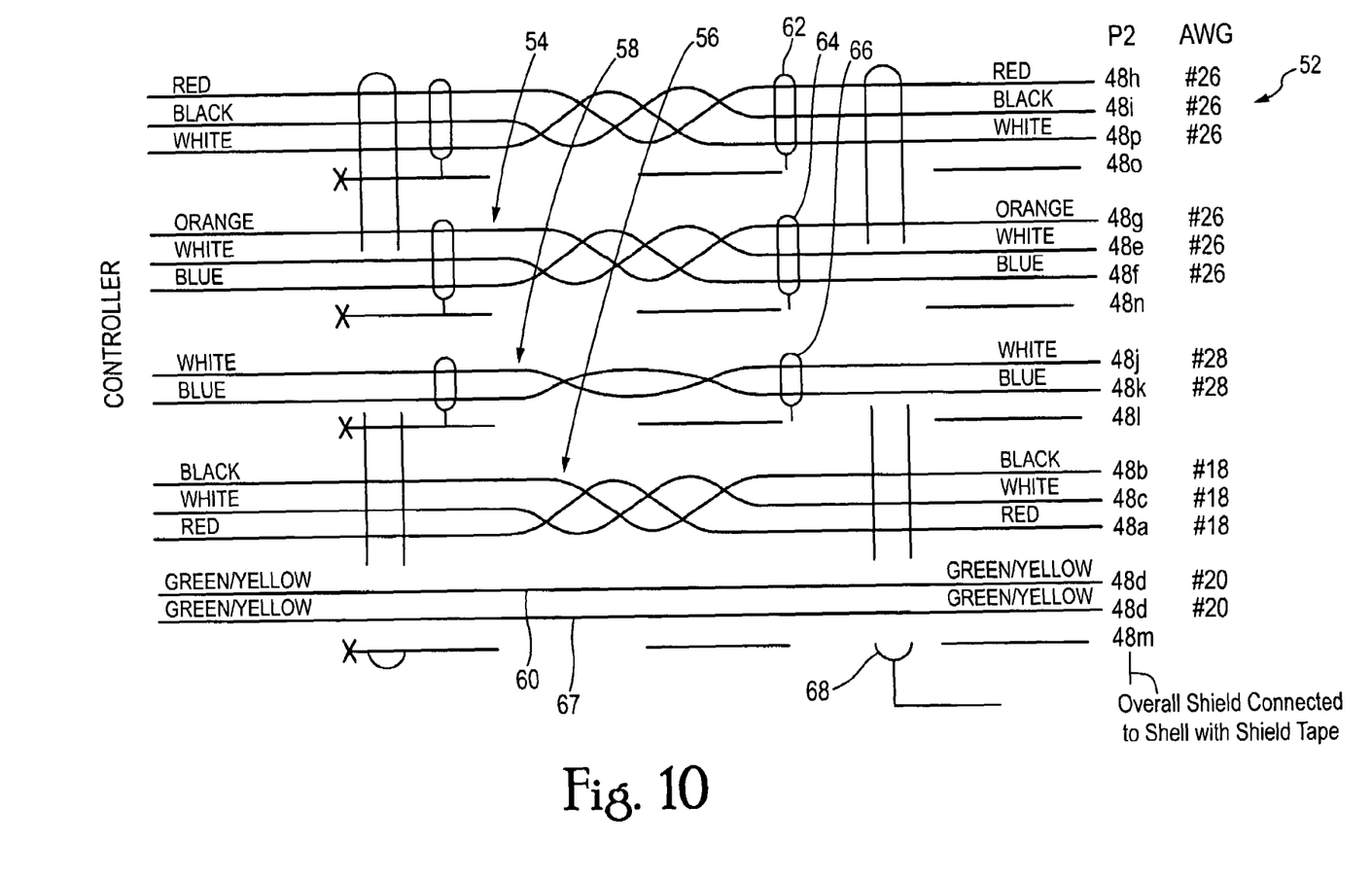
FIG. 10 is a diagram illustrating connections between mating elements of a connector and the conductor lines disposed within a cable, in accordance with one or more embodiments of the invention.

FIG. 10 is a diagram illustrating connections between mating elements 48a-48p and the conductor lines disposed within cable jacket 34 (see FIG. 2). As can be seen from FIG. 10, the conductor lines comprise a first twisted triad 52, a second twisted triad 54, a third twisted triad 56, a twisted pair 58, a first unpaired conductor 60, a second unpaired conductor 61, a first shield 62 (that shields first twisted triad 52), a second shield 64 (that shields second twisted triad 54), a third shield 66 (that shields twisted pair 58), and a fourth shield 68 (that acts as an overall shield).

In one embodiment, the conductor lines in first twisted triad 52 are coupled to secondary mating elements 48h, 48i, and 48p. The conductor lines in second twisted triad 54 are coupled to secondary mating elements 48e-48g. The conductor lines in third twisted triad 56 are coupled to primary mating elements 48a-48c. The conductor lines in twisted pair 58 are coupled to secondary mating elements 48j and 48k. First and second unpaired conductors 60 and 61 are both coupled to primary mating element 48d. In one embodiment, primary mating elements 48a-48d comprise pins with primary mating element 48d extending away from connection interface 46 farther than primary mating elements 48a-48c. First shield 62, second shield 64, third shield 66, and fourth shield 68 are coupled to secondary mating element 48o, secondary mating element 48n, secondary mating element 48l, and secondary mating element 48m, respectively.

Figure 11:
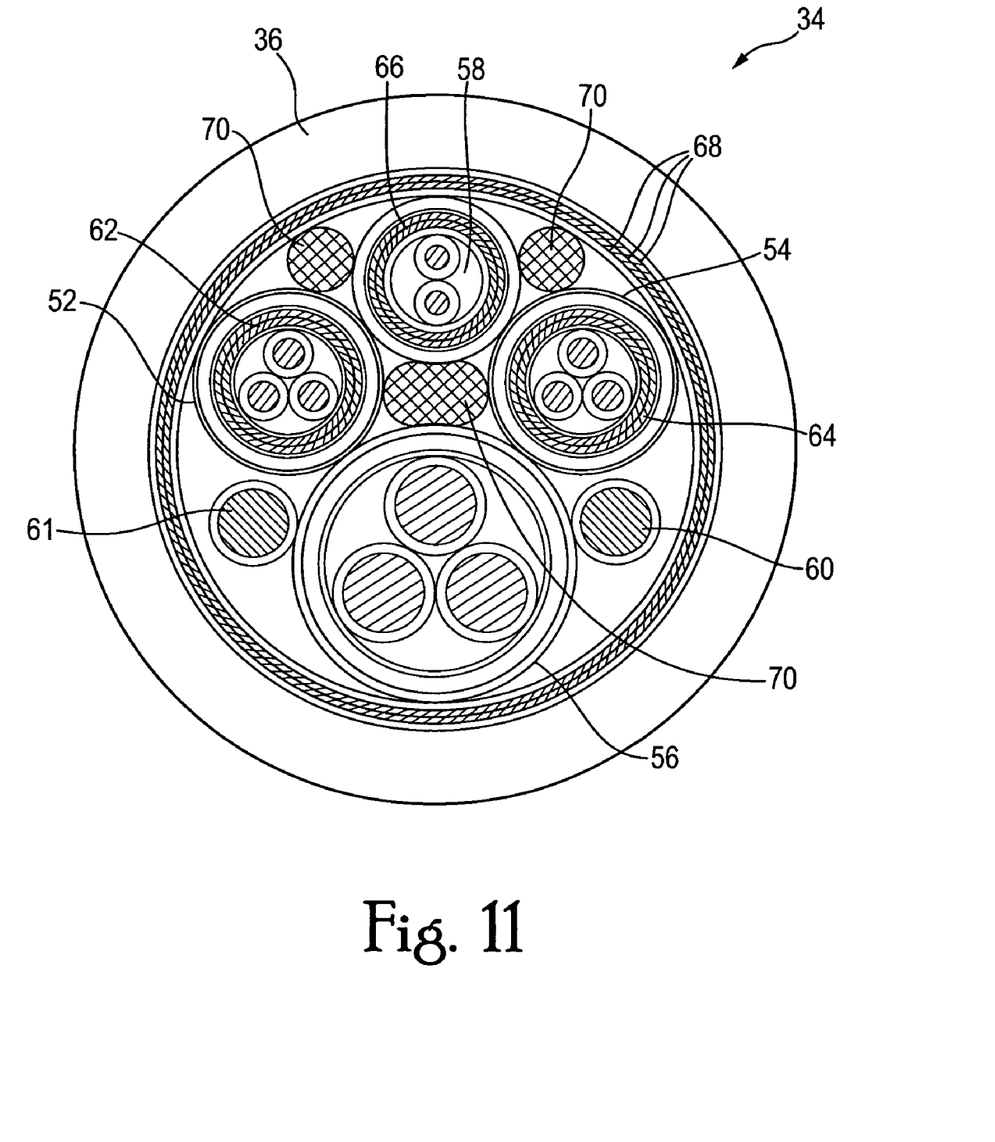
FIG. 11 illustrates a cross-sectional view of a cable that shows a layout of conductor lines within a cable jacket, according to one embodiment of the invention.

FIG. 11 shows a cross-sectional view of cable 24 that shows a layout of the conductor lines within cable jacket 36, according to one embodiment of the invention. As is shown in FIG. 11 (and represented in the diagram of FIG. 10), the conductor lines of first and second twisted triads 52 and 54 are 26awg, the conductor lines of twisted pair 58 are 28awg, the conductor lines of third twisted triad 56 are 18awg, and first and second unpaired conductors are both 20awg. Fillers 70 are disposed within cable 24 in order to maintain the positions of the conductor lines within cable jacket 34 and shield 68.

The configurations of and connections between the conductor lines within cable jacket 36 and mating elements 48 in connection interface 46 disclosed above provide various enhancements. For example, cable 24 is provided at a reduced cost (due to a reduction of mating elements, cabling components, and assembly labor), a lighter weight, a smaller cable diameter (resulting in an improved flexibility of cable 24), and other enhancements.

What is claimed is:

1. A connector that forms a portion of an operative link between an automated tool and a controller that controls the automated tool, wherein information and/or power are carried between the automated tool and the controller via the operative link, the connector comprising:
   a housing carrying a connection interface on a first side;
   wherein the connection interface comprises at least three primary mating elements and at least seven secondary mating elements, the primary mating elements having diameters between about 0.0616 inches and about 0.0635 inches and the secondary mating elements having diameters between about 0.0295 inches and about 0.0305 inches.

2. The connector of claim 1, wherein the connection interface has a substantially round cross-section.

3. The connector of claim 2, wherein the diameter of the cross-section is substantially equal to 0.653 inches.

4. The connector of claim 1, wherein the mating elements are pins.

5. The connector of claim 1, wherein the mating elements are sockets.

6. The connector of claim 1, wherein the at least three primary mating elements comprise four primary mating elements.

7. The connector of claim 1, wherein the at least seven secondary mating elements comprise 12 secondary mating elements.

8. The connector of claim 1, wherein the housing is adapted to interface with a U.S. MIL-DTL-38999 Series III shell with a shell size of 15.

9. The connector of claim 1, wherein the at least three primary mating elements comprise a first primary mating element, a second primary mating element, and the third primary mating element, and wherein coordinates of the positions of the first primary mating element, the second primary mating element, and the third primary mating element on the connection interface with respect to a Cartesian coordinate system originating substantially at the center of the connection interface and having units of inches are approximately (0.000", 0.010"), (−0.092", 0.170"), and (0.092", 0.170"), respectively.

10. The connector of claim 9, wherein the at least three primary mating elements further comprise a fourth primary mating element, and wherein the coordinates of the position of the fourth primary mating element on the connection interface with respect to the Cartesian coordinate system originating substantially at the center of the connection interface is approximately (0.000", −0.193").

11. The connector of claim 1, wherein the at least seven secondary mating elements comprise a first secondary mating element, a second secondary mating element, a third secondary mating element, a fourth secondary mating element, a fifth secondary mating element, a sixth secondary mating element, and a seventh secondary mating element, and wherein coordinates of the positions of the first secondary mating element, the second secondary mating element, the third secondary mating element, the fourth secondary mating element, the fifth secondary mating element, the sixth secondary mating element, and the seventh secondary mating element on the connection interface with respect to a Cartesian coordinate system originating substantially at the center of the connection interface and having units of inches are approximately (−0.227", −0.112"), (−0.253", −0.013"), (−0.238", 0.095"), (0.238", 0.095"), (0.164", −0.013"), (0.129", −0.092"), and (0.164", −0.196"), respectively.

12. The connector of claim 11, wherein the at least seven secondary mating elements further comprise an eighth secondary mating element, a ninth secondary mating element, a tenth secondary mating element, an eleventh secondary mating element, and a twelfth secondary mating element, and wherein the positions of the eighth secondary mating element, the ninth secondary mating element, the tenth secondary mating element, the eleventh secondary mating element, and the twelfth secondary mating element on the connection interface with respect to the Cartesian coordinate system originating substantially at the center of the connection interface are approximately (−0.164", −0.196"), (−0.129", −0.092"), (−0.164", 0.023"), (0.164", 0.023"), and (0.227", −0.112"), respectively.

13. The connector of claim 1, wherein the at least three primary mating elements comprise one or more mating elements that carry AC power.

14. The connector of claim 1, wherein the at least seven secondary mating elements comprise a secondary mating element that carries DC power that powers two or more sensors associated with the automated tool.

15. The connector of claim 1, wherein the at least seven secondary mating elements comprises one or more secondary mating elements that carry information at approximately 500 kbps.

* * * * *